United States Patent
Cho et al.

(10) Patent No.: US 9,430,184 B2
(45) Date of Patent: Aug. 30, 2016

(54) FOLDABLE DISPLAY DEVICE PROVIDING IMAGE LAYER AND METHOD OF CONTROLLING THE SAME

(71) Applicant: LG ELECTRONICS INC., Seoul (KR)

(72) Inventors: Eunhyung Cho, Seoul (KR); Sinae Chun, Seoul (KR); Jongho Kim, Seoul (KR); Jihwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 117 days.

(21) Appl. No.: 14/019,060

(22) Filed: Sep. 5, 2013

(65) Prior Publication Data
US 2015/0022436 A1    Jan. 22, 2015

(30) Foreign Application Priority Data
Jul. 22, 2013 (KR) .................. 10-2013-0085907

(51) Int. Cl.
| | |
|---|---|
| G06F 1/16 | (2006.01) |
| G09G 5/00 | (2006.01) |
| G06F 3/147 | (2006.01) |
| G06F 3/14 | (2006.01) |
| H04M 1/02 | (2006.01) |
| G06F 1/32 | (2006.01) |

(52) U.S. Cl.
CPC ............. *G06F 3/147* (2013.01); *G06F 1/1615* (2013.01); *G06F 1/1652* (2013.01); *G06F 3/1423* (2013.01); *H04M 1/0216* (2013.01); *H04M 1/0245* (2013.01); *H04M 1/0247* (2013.01); *G06F 1/3265* (2013.01); *G09G 2340/12* (2013.01); *G09G 2356/00* (2013.01); *G09G 2380/02* (2013.01); *H04M 2250/16* (2013.01); *Y02B 60/1242* (2013.01)

(58) Field of Classification Search
USPC ....................................... 345/156
See application file for complete search history.

(56) References Cited

U.S. PATENT DOCUMENTS

| | | | |
|---|---|---|---|
| 8,251,278 | B2 | 8/2012 | Cohen et al. |
| 2007/0252804 | A1 | 11/2007 | Engel et al. |
| 2007/0279315 | A1 | 12/2007 | Laves et al. |
| 2010/0064244 | A1 | 3/2010 | Kilpatrick, II et al. |
| 2010/0201604 | A1 | 8/2010 | Kee et al. |
| 2013/0086508 | A1 | 4/2013 | Oguz |
| 2013/0229324 | A1* | 9/2013 | Zhang et al. ............. 345/1.3 |
| 2014/0111820 | A1* | 4/2014 | Kim et al. ................ 358/1.13 |

FOREIGN PATENT DOCUMENTS

| | | |
|---|---|---|
| KR | 10-2010-0092222 A | 8/2010 |
| WO | WO 2007/124240 A1 | 11/2007 |

* cited by examiner

*Primary Examiner* — Kent Chang
*Assistant Examiner* — Scott Au
(74) *Attorney, Agent, or Firm* — Birch, Stewart, Kolasch & Birch, LLP

(57) ABSTRACT

A method of controlling a foldable display device according to one embodiment of the present specification can include the steps of displaying a first image in a first area, a second image in a second area, and a third image in a third area in a mode that a foldable display device is not folded, wherein the first area is positioned at the center of the foldable display device, the second area is positioned at the left of the first area, and the third area is positioned at the right of the first area, detecting that the second area or the third area of the foldable display device is folded, if the second area is folded, assigning the first image to a first image layer of the first area and assigning the second image of the folded second area to a second image layer of the first area.

19 Claims, 10 Drawing Sheets

FOLDABLE DISPLAY DEVICE PROVIDING IMAGE LAYER AND METHOD OF CONTROLLING THE SAME

This application claims the benefit of the Korean Patent Application No. 10-2013-0085907, filed on Jul. 22, 2013, which is hereby incorporated by reference as if fully set forth herein.

BACKGROUND OF THE INVENTION

1. Field of the Invention

The present specification relates to a foldable display device, and more particularly, to a foldable display device adaptively generating an image layer according to a folded form and the foldable display device assigning an image to each layer.

2. Discussion of the Related Art

As a portable display device is disseminated, users can carry the portable display device by hands. Portability of the portable display device can be enhanced by light of weight and small size. The portable device can be manufactured by using a bendable material or in a foldable form to enhance portability. If the foldable display device is folded, a display area capable of displaying digital information decreases in size. And, the display information used to be displayed in a folded display area cannot be seen to a user anymore. Hence, it is necessary to have a technology to adaptively generate an image layer according to a folded mode of the foldable display device and to assign the digital information of the folded display area to a generated image layer.

SUMMARY OF THE INVENTION

Accordingly, the present specification is directed to an apparatus and method thereof that substantially obviate one or more problems due to limitations and disadvantages of the related art.

An object of the present specification is to provide a foldable display device adaptively generating an image layer according to whether a display area is folded and a method of controlling therefor. In particular, in the present specification, the foldable display device can determine an order of image layers according to a folding order and can assign digital information in a folded display area to each image layer.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a foldable display device according to one embodiment of the present specification includes a display unit configured to include a first area positioned at the center of the foldable display device, a second area positioned at the left of the first area, and a third area positioned at the right of the first area, a sensor unit configured to detect that the second area or the third area of the display unit is folded, and a controller configured to assign an image to an image layer, the controller configured to display a first image in the first area, a second image in the second area, and a third image in the third area in an unfolded mode of the foldable display device, if the second area is folded, the controller configured to assign the first image to a first image layer of the first area and configured to assign the second image of the folded second area to a second image layer of the first area, if the third area is folded, the controller configured to assign the first image to the first image layer of the first area and configured to assign the third image of the folded third area to the second image layer of the first area, wherein the first image layer is an upper layer of the second image layer.

To achieve these and other advantages and in accordance with the purpose of the present specification, as embodied and broadly described, according to one embodiment, a method of controlling a foldable display device includes the steps of displaying a first image in a first area, a second image in a second area, and a third image in a third area in a state that a foldable display device is not folded, wherein the first area is positioned at the center of the foldable display device, the second area is positioned at the left of the first area, and the third area is positioned at the right of the first area, detecting that the second area or the third area of the foldable display device is folded, if the second area is folded, assigning the first image to a first image layer of the first area and assigning the second image of the folded second area to a second image layer of the first area, and if the third area is folded, assigning the first image to the first image layer of the first area and assigning the third image of the folded third area to the second image layer of the first area.

According to the present specification, if a display area is folded, a foldable display device can generate an image layer corresponding to the folded display area.

According to the present specification, a foldable display device can determine an order of an image layer according to an order of folding each display area.

According to the present specification, a foldable display device can display an image layer situated at the top among a plurality of image layers.

According to the present specification, a foldable display device can display an indicator for an image layer, which is not situated at the top among a plurality of image layers.

According to the present specification, a foldable display device can modify a displayed image layer according to a control input.

According to the present specification, if an image of a displayed image layer situated at the top is expanded more than a threshold value, a foldable display device can display an image of an image layer situated at the second top.

According to the present specification, a foldable display device can determine an order of an indicator of each image layer according to an order of folding each display area.

It is to be understood that both the foregoing general description and the following detailed description of the present specification are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

While the embodiments have been concretely described with reference to the attached diagrams and the contents written on the diagrams, a scope of claims may be non-restricted or non-limited to the embodiments.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

In the present specification, a foldable display device can include a foldable smartphone, a foldable smart pad, a foldable music player, a foldable tablet computer, a foldable notebook, or a flexible display device.

Figure 1:
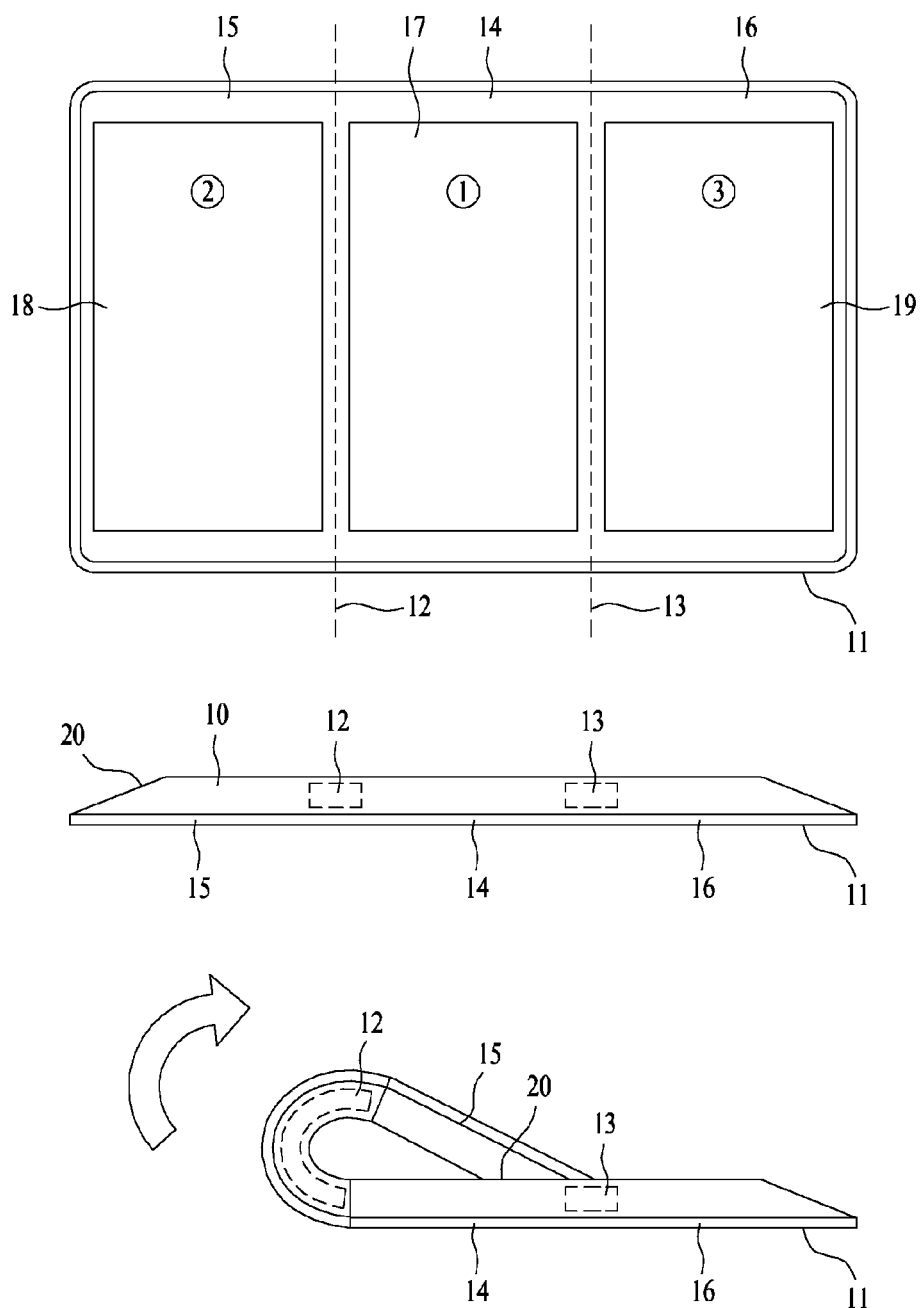
FIG. 1 is a diagram of a foldable display device according to one embodiment of the present specification.

FIG. 1 is a diagram of a foldable display device according to one embodiment of the present specification. The top of FIG. 1 is a front view of a foldable display device in an unfolded mode. The foldable display device 11 can include a foldable or bendable display unit. A foldable display unit in an unfolded mode can be folded or bended on the basis of a folding axis of the foldable display device. The foldable display device 11 can include two or more folding axes. For instance, the foldable display device 11 including two folding axes can be folded into a size of ⅓ in a manner of dividing a foldable display unit into a 3 areas. In the following description, although a tripartition foldable display device including two folding axes is explained as an example, the contents of the present specification can be applied to a bipartition foldable display device or a foldable display device divided into more than 4 parts.

The foldable display device 11 can include a foldable display unit in a front area. The foldable display unit can include a touch-sensitive surface. The foldable display unit can be divided by a first folding axis 12 and a second folding axis 13. The foldable display device can define the display areas divided by the folding axes as a first area 14 in the middle, a second area 15 positioned at the left, and a third area 15 positioned at the right of the first area.

The divided display areas of the foldable display device 11 can include at least one image layer, respectively. The foldable display device 11 can assign an image to an image layer. An image layer means a virtual space to which an image can be assigned. The image assigned to the image layer can be displayed in the display area. If there exist a plurality of image layers, the foldable display device 11 can display the image assigned to the image layer situated at the top of each of the display areas in each of the display areas.

The foldable display device 11 can display an image different from each other in each of the divided display areas, respectively. In this case, the image can include at least one selected from the group consisting of an execution screen of an application, a wallpaper image, and a content image. The foldable display device 11 can assign a first image to a first image layer of the first area 14. The foldable display device 11 can display the first image assigned to the first image layer in the first area 14. In this case, the first image layer is a layer situated at the top of the first area 14 and becomes an object to be displayed in the first area.

Similarly, the foldable display device 11 can assign a second image and a third image to the first image layers of the second area 15 and the third area 16, respectively. The foldable display device 11 can display the second image assigned to the first image layer of the second area 15 in the second area 15. The foldable display device 11 can display the third image assigned to the first image layer of the third area 16 in the third area 16. In this case, the first image layer of the second area is a layer situated at the top of the second area 15 and becomes an object to be displayed in the second area. And, the first image layer of the third area is a layer situated at the top of the third area 16 and becomes an object to be displayed in the third area.

The foldable display device displays the first image 17 in the first area 14, displays the second image 18 in the second area 15, and displays the third image 19 in the third area 16. The first, second, and third image may correspond to the images belonging to applications, which are independent from each other. According to embodiment, at least two images among the first, second, and third image may correspond to the images included in an identical application.

The middle of FIG. 1 is a floor plan of the foldable display device in an unfolded mode. The foldable display device includes a display unit and the display unit consists of the first area 14, the second area 15, and the third area 16. The display unit may have a form that the second area 15 is connected to a left part of the first area 14 and the third area 16 is connected to a right part of the first area 14.

The foldable display device 11 can include a first folding axis 12 and a second folding axis 13 in a body 10 combined with the display unit. The first folding axis 12 can be positioned between the first area 14 and the second area 15. The second folding axis 13 can be positioned between the first area 14 and the third area 16. And, the first folding axis 12 and the second folding axis 13 can be made of an elastic material. After the second area 15 and/or the third area 16 is folded in a prescribed direction, if a preset power is added, the second area 15 and/or the third area 16 can be returned to a position of the unfolded mode by the first folding axis 12 and the second folding axis 13.

The bottom of FIG. 1 is a floor plan of the foldable display device in a folded mode. The foldable display device can use an elastic material for a boundary part between the first area 14 and the second area 15 of the display unit and the first folding axis 12. As depicted in the bottom of FIG. 1, if the second area 15 is folded in a clockwise direction, one side 20 of the body of the second area 15 may contact with the body 10 of the first area. In this case, a magnetic attraction can be applied between the one side 20 of the body of the second area 15 and the body 10 of the first area contacted with the one side of the body of the second area. In particular, the one side 20 of the body of the second area 15 and the body 10 of the first area have a pole different from each other.

Meanwhile, when the one side 20 of the body of the second area 15 is contacted with the body of the first area 14, the body of the second area and the body of the first area are not contacted with each other. In particular, while the first folding axis 12 has a prescribed elastic force, as the body of the second area rotates, the first folding axis maintains a prescribed shape. Hence, there may exist a space between the body of the second area and the body of the first area.

Meanwhile, a position of the body of the first area 14 with which the one side 20 of the body of the second area 15 is contacted may correspond to a position parallel to the body of the third area when the body of the third area 16 is contact with the second area 15 in a manner of being folded in a counterclockwise direction.

In the foregoing description, the folding axis using an elastic material is explained. Yet, embodiment of the present specification may be non-limited to this. A folding axis using a hinge structure and a folding axis using a sliding structure can be included in the embodiment of the present specification.

Figure 2:
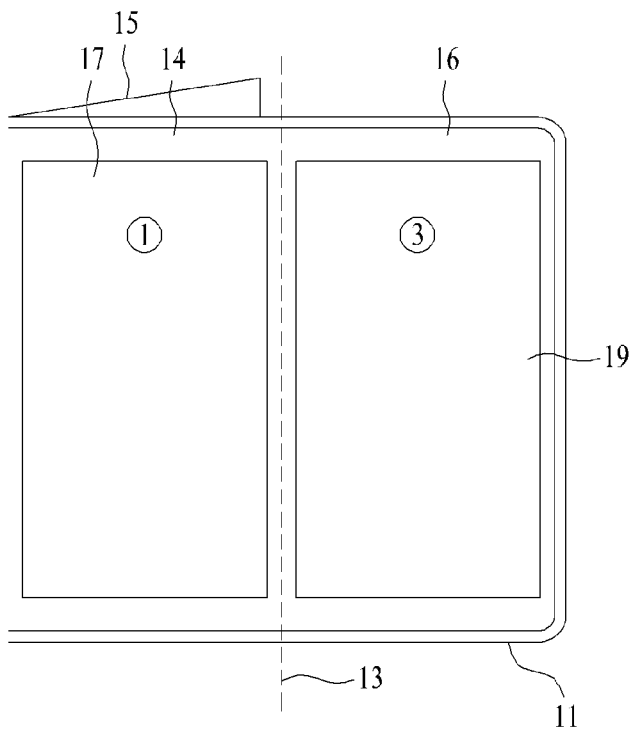
FIG. 2 is a diagram of a state that one side of a display area of a foldable display device is folded according to one embodiment of the present specification.
Figure 2:
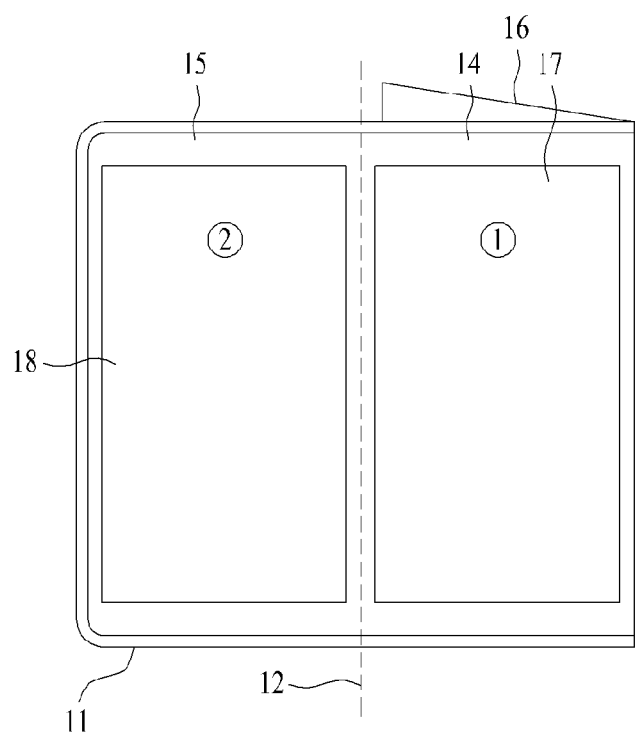

FIG. 2 is a diagram of a state that one side of a display area of a foldable display device is folded according to one embodiment of the present specification. At least one of the second area 15 and the third area 16 of the foldable display device 11 can be folded. The top of FIG. 2 is a diagram of the foldable display device 11 of which the second area 15 is folded on the basis of the first folding axis. The foldable display device 11 in a folded mode can display the first image 17 and the third image 19 in the first area 14 and the third area 16, respectively. In this case, the second image displayed in the folded second area 15 is not included in a user's view.

The bottom of FIG. 2 is a diagram of the foldable display device 11 of which the third area 16 is folded on the basis of the second folding axis. The foldable display device 11 in a folded mode can display the first image 17 and the second image 18 in the first area 14 and the second area 15, respectively. In this case, the third image displayed in the folded third area 16 is not included in a user's view.

As mentioned in the foregoing description, if a part of the display area of the foldable display device 11 is folded, the image displayed in the corresponding area cannot be seen to a user anymore. Hence, it is necessary to have a method of providing the image displayed in the folded display area.

Figure 3:
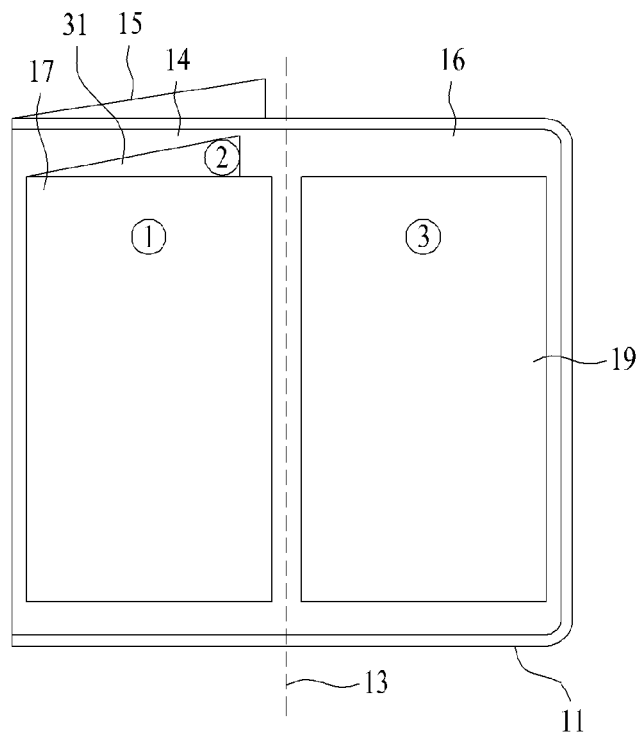
FIG. 3 is a diagram of a method of displaying an image layer of a foldable display device of which one side of a display area is folded according to one embodiment of the present specification.
Figure 3:
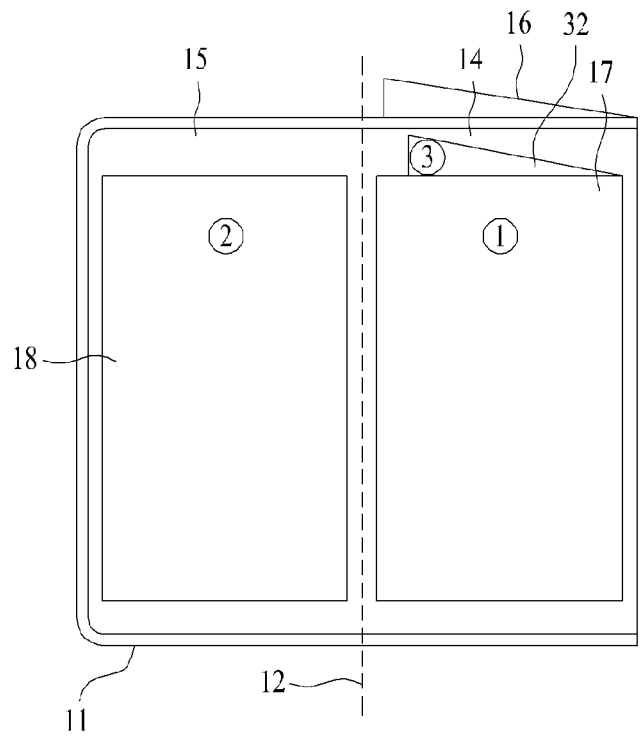

FIG. 3 is a diagram of a method of displaying an image layer of a foldable display device of which one side of a display area is folded according to one embodiment of the present specification. The foldable display device 11 detects that a display area is folded and can assign the image displayed in the folded display area to an image layer of the display area, which is not folded. In particular, the foldable display device can assign the image, which is assigned to the first image layer of the folded display area, to one of the image layer of the display area, which is not folded. And, the foldable display device can display an indicator of the image assigned to the image layer of the display area, which is not folded.

The top of FIG. 3 indicates a state that the left display area of the foldable display device 11 is folded. If the second area 15 is folded, the foldable display device 11 can assign the second image displayed in the second area 15 to the image layer of the first area 14. Since the first image 17 is assigned to the first image layer of the first area 14, the foldable display device 11 can assign the second image to a second top image layer. In particular, the foldable display device 11 can assign the second image to a second image layer. In this case, the first image layer may correspond to an upper layer of the second image layer.

The foldable display device 11 can display the first image 17 assigned to the first image layer and can configure the second image assigned to the second image layer as a standby state without displaying the second image. Yet, the foldable display device can display an indicator 31 indicating that the second image is assigned to the second image layer of the first area 14 in the first display area. For instance, the foldable display device can display a form of which the second area 15 is folded in the first area of the display unit with the indicator 31. The foldable display device 11 can include a part of the second image in the indicator 31 displayed in the first area.

The foldable display device 11 can apply a connection relation between areas of the display unit to the displayed image and the indicator 31. The left side of the first area 14 of the display unit is connected to the right side of the second area 15. Hence, the foldable display device 11 can display the indicator 31 with a shape that the second image is connected to the left side of the displayed first image. In this case, the second image can be displayed in a manner that the left and the right of the second image are reversed.

The foldable display 11 device can control the indicator 31 according to an angle of which the second area 15 is folded. The foldable display device 11 can display in a manner of changing an angle formed by the first image 17 and the indicator 31 according to the angle formed by the folded second area 15 and the first area 14. Hence, a user checks the angle formed by the indicator 31 and the first image 17 by a vision and can be aware of how much the second area 15 is folded.

The bottom of FIG. 3 indicates a state that the right display area of the foldable display device 11 is folded. If the third area 16 is folded, the foldable display device 11 can assign the third image displayed in the third area 16 to the image layer of the first area 14. Since the first image 17 is assigned to the first image layer of the first area 14, the foldable display device 11 can assign the third image to a second top image layer. In particular, the foldable display device 11 can assign the third image to a second image layer. In this case, the first image layer may correspond to an upper layer of the second image layer.

The foldable display device 11 can display the first image 17 assigned to the first image layer and can configure the third image assigned to the second image layer as a standby state without displaying the third image. Yet, the foldable display device can display an indicator 32 indicating that the third image is assigned to the second image layer of the first area 14 in the first display area. For instance, the foldable display device can display a form of which the third area 15 is folded in the first area of the display unit with the indicator 32. The foldable display device 11 can include a part of the third image in the indicator 32 displayed in the first area.

The foldable display device 11 can apply a connection relation between areas of the display unit to the displayed image and the indicator 32. The right side of the first area 14 of the display unit is connected to the left side of the third area 16. Hence, the foldable display device 11 can display the indicator 32 with a shape that the third image is connected to the right side of the displayed first image. In this case, the third image can be displayed in a manner that the left and the right of the third image are reversed.

The foldable display device 11 can control the indicator 32 according to an angle of which the third area 16 is folded. The foldable display device 11 can display in a manner of changing an angle formed by the first image 17 and the indicator 32 according to the angle formed by the folded third area 16 and the first area 14. Hence, a user checks the angle formed by the indicator 32 and the first image 17 by a vision and can be aware of how much the third area 16 is folded.

The foldable display device 11 can display the indicator of various forms. This shall be described in FIG. 7.

Figure 4:
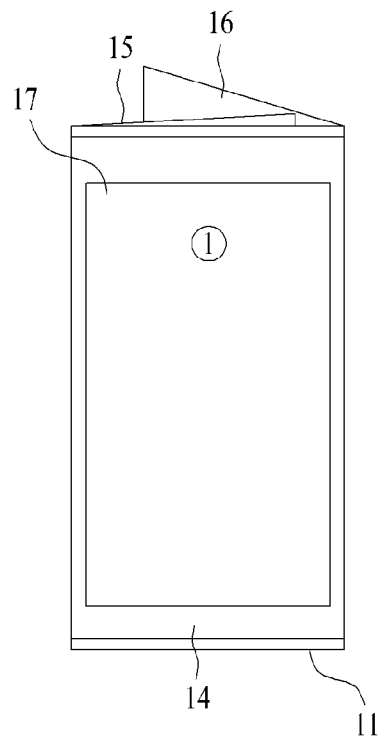
FIG. 4 is a diagram of a state that both sides of a display area of a foldable display device are folded according to one embodiment of the present specification.
Figure 4:
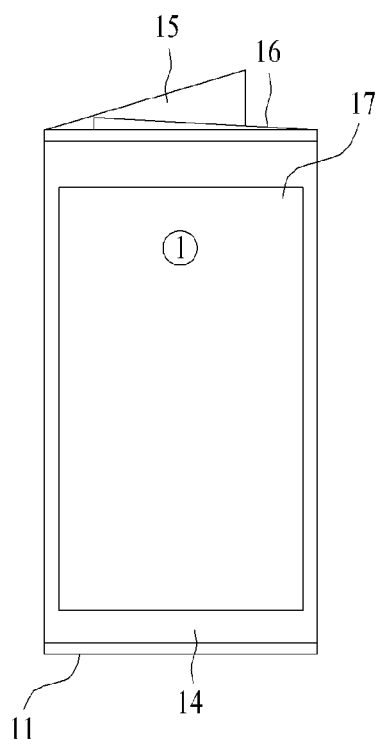

FIG. 4 is a diagram of a state that both sides of a display area of a foldable display device are folded according to one embodiment of the present specification. In the present specification, the second area in the left and the third area in the right on the basis of the first area positioned at the middle of the foldable display device can be folded. The foldable display device can configure an order of assigning images displayed in the second area and the third area to the image layers of the first area or a priority according to an order of folding the second area and the third area.

The top of FIG. 4 is a diagram of the foldable display device 11 in a folded mode of which the third area 16 is folded on the basis of the second folding axis after the second area 15 is folded on the basis of the first folding axis. The foldable display device 11 in the folded mode can display the first image 17 in the first area 14. In this case, the second image and the third image displayed in the folded second area 15 and the folded third area 16 are not included in the user's view. Hence, the foldable display device 11 can assign the second image to the second image layer of the first area 14 and can assign the third image to the third image layer of the first area 14 according to the order of folding.

The bottom of FIG. 4 is a diagram of the foldable display device 11 in a folded mode of which the second area 15 is folded on the basis of the first folding axis after the third area 16 is folded on the basis of the second folding axis. The foldable display device 11 in the folded mode can display the first image 17 in the first area 14. In this case, the second image and the third image displayed in the folded second area 15 and the folded third area 16 are not included in the user's view. Hence, the foldable display device 11 can assign the third image to the second image layer of the first area 14 and can assign the second image to the third image layer of the first area 14 according to the order of folding.

As mentioned in the foregoing description, the foldable display device 11 in the folded mode cannot provide the images displayed in the folded display area to a user. And, the user cannot be aware that what images are displayed in the folded display area until the folded display area is unfolded.

Figure 5:
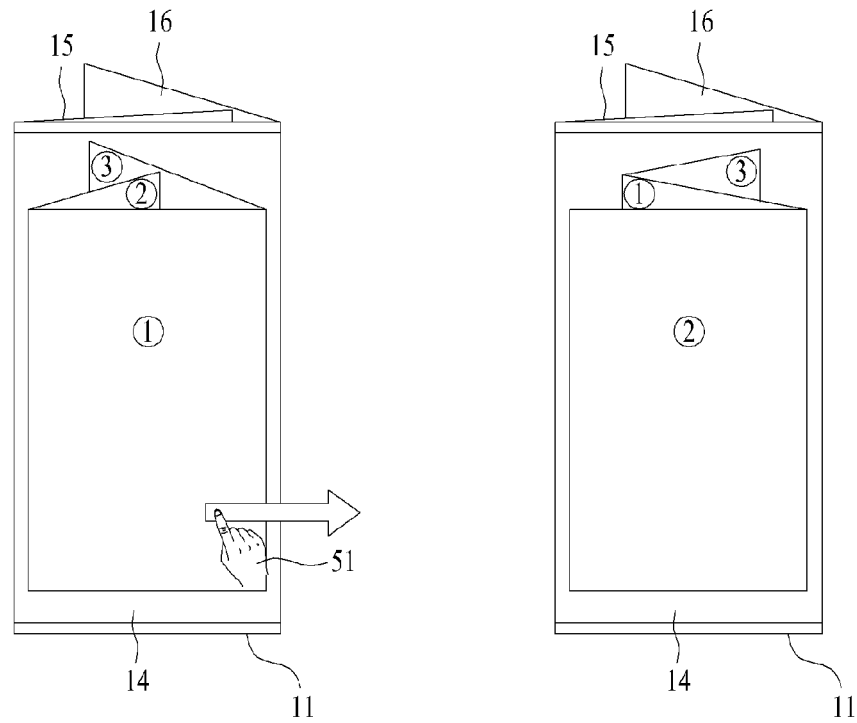
FIG. 5 is a diagram of a method of displaying an image layer of a foldable display device of which both sides of a display area are folded according to one embodiment of the present specification.
Figure 5:
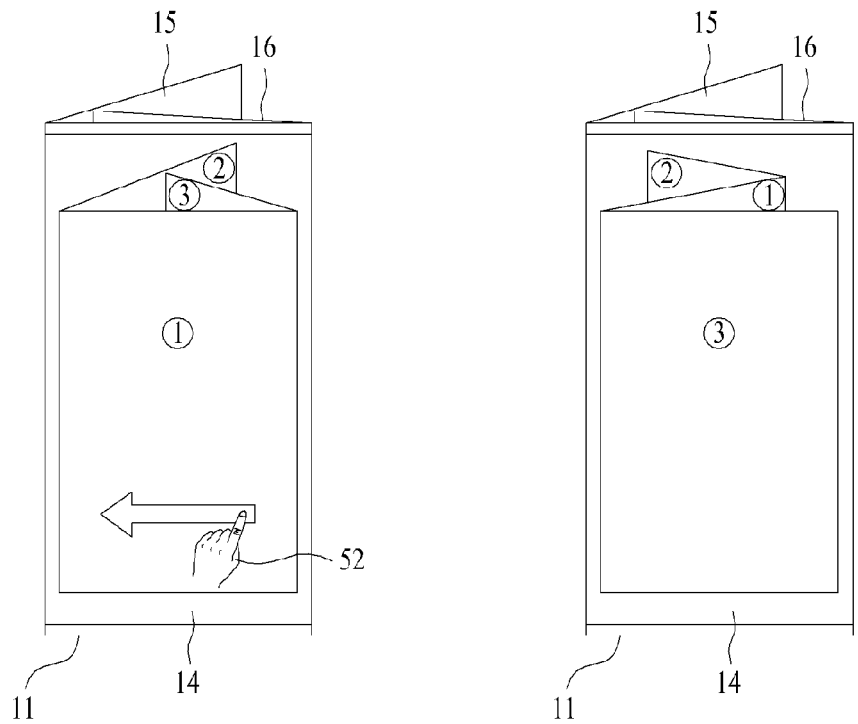

In FIG. 5, a method of checking the images of the folded display area, which are assigned to the second top image layers of the first area 14, is described.

FIG. 5 is a diagram of a method of displaying an image layer of a foldable display device of which both sides of a display area are folded according to one embodiment of the present specification. In the present specification, the second area in the left and the third area in the right on the basis of the first area positioned at the middle of the foldable display device can be folded. The foldable display device can configure an order of assigning images displayed in the second area and the third area to the image layers of the first area or a priority according to an order of which the second area and the third area are folded. And, the foldable display device can display an indicator to which an order of folding the second area and the third area is applied.

In the top left of FIG. 5, the foldable display device 11 can apply a folded mode of the display unit to the indicator. The foldable display device 11 is in a state that the third area 16 is folded after the second area 15 of the display unit is folded. Hence, the first area 14 of the display unit can include the first image in the first image layer, the second image in the second image layer, and the third image in the third image layer, respectively.

The foldable display device 11 can display the first image assigned to the first image layer in the first area. The second image and the third image respectively assigned to the second image layer and the third image layer can be displayed as the indicator. The foldable display device 11 can display the second image connected to the left side of the displayed first image and the third image connected to the right side of the first image as the indicator.

The foldable display device 11 can apply a folding direction, a folding angle, and a folding order of each of folded areas to the image displayed in each of the folded areas. In particular, the foldable display device can display a result of being folded in a state that the second image is connected to the first image according to the folding direction, the folding angle, and the folding order of the second area 15. And, the foldable display device can display a result of being folded in a state that the third image is connected to the first image according to the folding direction, the folding angle, and the folding order of the second area 15. Hence, the foldable display device can display the indicator in a form that the third image is folded after the second image is folded into the direction of the back side of the first image. In the top left of FIG. 5, since the second image and the third image are folded into the direction of the back side of the first area 14, the back side of each of the images or the images of left-right reversed form can be displayed.

The top right of FIG. 5 is a diagram of a result of flicking 51 the first image displayed in the top left of FIG. 5. If a displayed image is flicked, the foldable display device 11 can display one of the images assigned to the second top image layers. In this case, the foldable display device 11 can determine an image to be displayed according to a direction of the flicking 51.

If the first image is flicked from the left to the right, the foldable display device 11 can display the second image, which is connected to the left of the first image in the indicator. In particular, the foldable display device 11 can assign the second image to the first image layer of the first area 14 according to the flicking 51. And, the foldable display device 11 assigns the flicked first image to the second image layer of the first area 14 and can assign the third image, which is used to be assigned to the second image layer of the first area 14, to the third image layer. In this case, since the first image is folded into the direction of the back side of the first area 14 of the display unit, the back side of the first image or the first image of left-right reversed form can be displayed. Since the third image is folded into the direction of the front side of the first area 14, the third image of an original state can be displayed without being reversed in left-right.

In the top left of FIG. 5, if the first image is flicked from the right to the left, the foldable display device can display the third image connected to the right of the first image in the indicator. In particular, the foldable display device 11 can assign the third image to the first image layer of the first area 14 according to the flicking from the right to the left. And, the foldable display device 11 assigns the flicked first image to the second image layer of the first area 14 and can assign the second image, which is used to be assigned to the second image layer of the first area 14, to the third image layer. In this case, since the first image is folded into the direction of the back side of the first area 14 of the display unit, the back side of the first image or the first image of left-right reversed form can be displayed. Since the second image is folded into the direction of the front side of the first area 14, the second image of an original state can be displayed without being reversed in left-right.

In the bottom left of FIG. 5, the foldable display device 11 can apply a folded mode of the display unit to the indicator. The foldable display device 11 is in a state that the second area 15 is folded after the third area 16 of the display unit is folded. Hence, the first area 14 of the display unit can include the first image in the first image layer, the third image in the second image layer, and the second image in the third image layer, respectively.

The foldable display device 11 can display the first image assigned to the first image layer in the first area 14. The third image and the second image respectively assigned to the second image layer and the third image layer can be displayed as the indicator. The foldable display device 11 can display the second image connected to the left side of the displayed first image and the third image connected to the right side of the first image as the indicator.

The foldable display device 11 can apply a folding direction, a folding angle, and a folding order of each of folded areas to the image displayed in each of the folded areas. In particular, the foldable display device can display a result of being folded in a state that the second image is connected to the first image according to the folding direction, the folding angle, and the folding order of the second area 15. And, the foldable display device can display a result of being folded in a state that the third image is connected to the first image according to the folding direction, the folding angle, and the folding order of the third area 16. Hence, the foldable display device can display the indicator in a form that the second image is folded after the third image is folded into the direction of the back side of the first image. In the bottom left of FIG. 5, since the second image and the third image are folded into the direction of the back side of the first area 14, the back side of each of the images or the images of left-right reversed form can be displayed.

The bottom right of FIG. 5 is a diagram of a result of flicking 52 the first image displayed in the bottom left of FIG. 5. If a displayed image is flicked, the foldable display device 11 can display one of the images assigned to the second top image layers. In this case, the foldable display device 11 can determine an image to be displayed according to a direction of the flicking 52.

If the first image is flicked from the right to the left, the foldable display device 11 can display the third image, which is connected to the right of the first image in the indicator. In particular, the foldable display device 11 can assign the third image to the first image layer of the first area 14 according to the flicking 52. And, the foldable display device 11 assigns the flicked first image to the second image layer of the first area 14 and can assign the second image, which is used to be assigned to the second image layer of the first area 14, to the third image layer. In this case, since the first image is folded into the direction of the back side of the first area 14 of the display unit, the back side of the first image or the first image of left-right reversed form can be displayed. Since the second image is folded into the direction of the front side of the first area 14, the second image of an original state can be displayed without being reversed in left-right.

In the bottom left of FIG. 5, if the first image is flicked from the left to the right, the foldable display device can display the second image connected to the left of the first image in the indicator. In particular, the foldable display device 11 can assign the second image to the first image layer of the first area 14 according to the flicking from the left to the right. And, the foldable display device 11 assigns the flicked first image to the second image layer of the first area 14 and can assign the third image, which is used to be assigned to the second image layer of the first area 14, to the third image layer. In this case, since the first image is folded into the direction of the back side of the first area 14 of the display unit, the back side of the first image or the first image of left-right reversed form can be displayed. Since the third image is folded into the direction of the front side of the first area 14, the third image of an original state can be displayed without being reversed in left-right.

Figure 6:
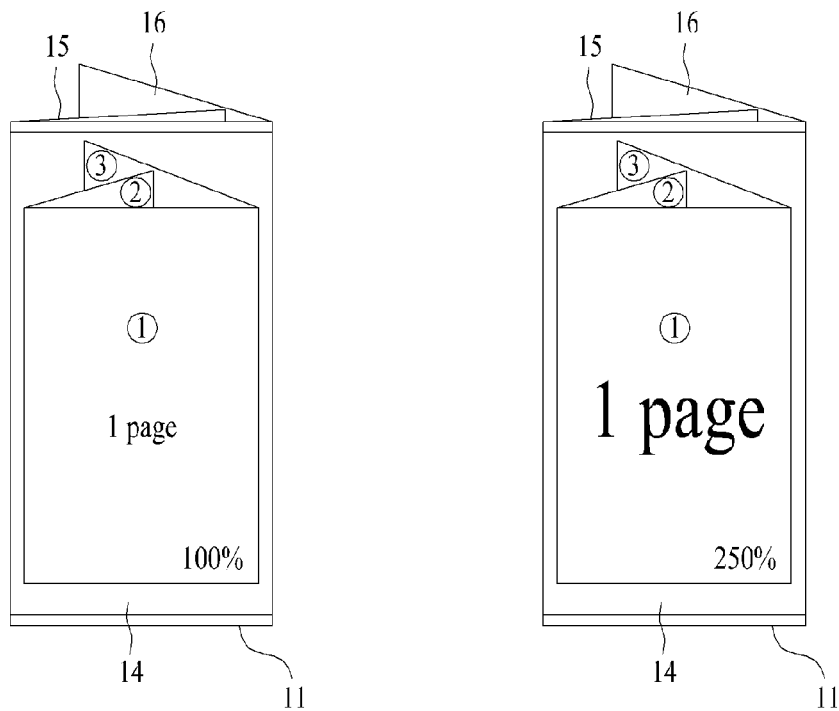
FIG. 6 is a diagram of a method of changing a displayed image layer according to one embodiment of the present specification.
Figure 6:
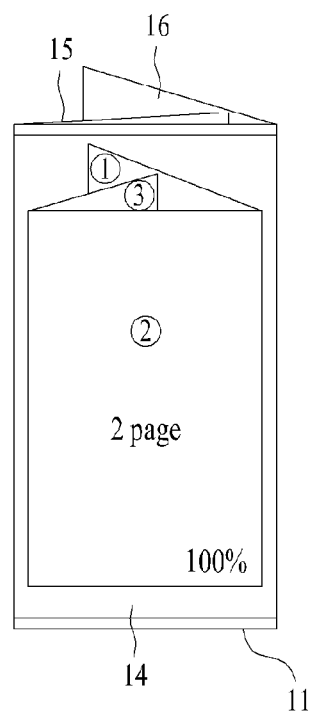

FIG. 6 is a diagram of a method of changing a displayed image layer according to one embodiment of the present specification. The foldable display device can change an image to be displayed or an image layer to which a displayed image is assigned according to a control input performing a zoom-in or a zoom-out the displayed image.

In the top left of FIG. 6, the foldable display device 11 can apply a folded mode of the display unit to the indicator. The foldable display device 11 is in a state that the third area 16 is folded after the second area 15 of the display unit is folded. Hence, the foldable display device 11 can assign the first image to the first image layer of the first area, assign the second image to the second image layer, and assign the third image to the third image layer. The foldable display device 11 can display the first image assigned to the first image layer in the first area. The foldable display device can display the indicator of the second image and the third image, which are assigned to the second image layer and the third image layer. A magnification of the first image displayed in the first area is 100%.

The top right of FIG. 6 is a diagram of a case that the magnification of the displayed first image is expanded to 250%. If the magnification is higher than a preset first threshold, the foldable display device 11 can change the displayed image or the image layer to which the displayed image is assigned. If the preset first threshold is 250%, the foldable display device 11 changes the displayed first image or changes from the image layer to which the displayed first image is assigned to a different image layer. In case that the foldable display device 11 changes the displayed first image, the foldable display device 11 can display an image assigned to the second top image layer.

The bottom right of FIG. 6 indicates a result that the foldable display device 11 changes the displayed image. If the magnification of the displayed first image is expanded higher than the first threshold, the foldable display device 11 can display a second image assigned to the second image layer of the first area. Or, if the magnification of the displayed first image is expanded higher than the first threshold, the foldable display device 11 can assign the second image used to be assigned to the second image layer to the first image layer, assign the third image used to be assigned to the third image layer to the second image layer, and assign the first image to the third image layer. Hence, the foldable display device 11 can display the second image assigned to the first image layer. The foldable display device 11 can display the second image with 100% magnification.

In the bottom right of FIG. 6, if the displayed second image is zoomed-out, the content explained in the above can be inversely applied. If the magnification of the displayed image becomes lower than a preset second threshold by the zoom-out, the foldable display device 11 changes the displayed image or the image layer to which the displayed image is assigned. If the magnification of the second image is reduced lower than the preset second threshold, the foldable display device 11 changes the displayed second image or changes from the first image layer to which the displayed second image is assigned to a different image layer. In case that the foldable display device 11 changes the displayed second image, the foldable display device 11 can display a previously displayed image.

If the magnification of the displayed second image is reduced lower than the second threshold, the foldable display device 11 can display the first image to assigned to the third image layer of the first area. Or, if the magnification of the displayed second image is reduced lower than the second threshold, the foldable display device 11 can assign the third image used to be assigned to the second image layer to the third image layer, assign the second image used to be assigned to the first image layer to the second image layer, and assign the first image used to be assigned to the third image layer to the first image layer. Hence, the foldable display device 11 can display the first image assigned to the first image layer. The foldable display device 11 displays the first image with 100% magnification or can display the first image with the magnification of the first threshold, which is the magnification before the image is changed.

Figure 7:
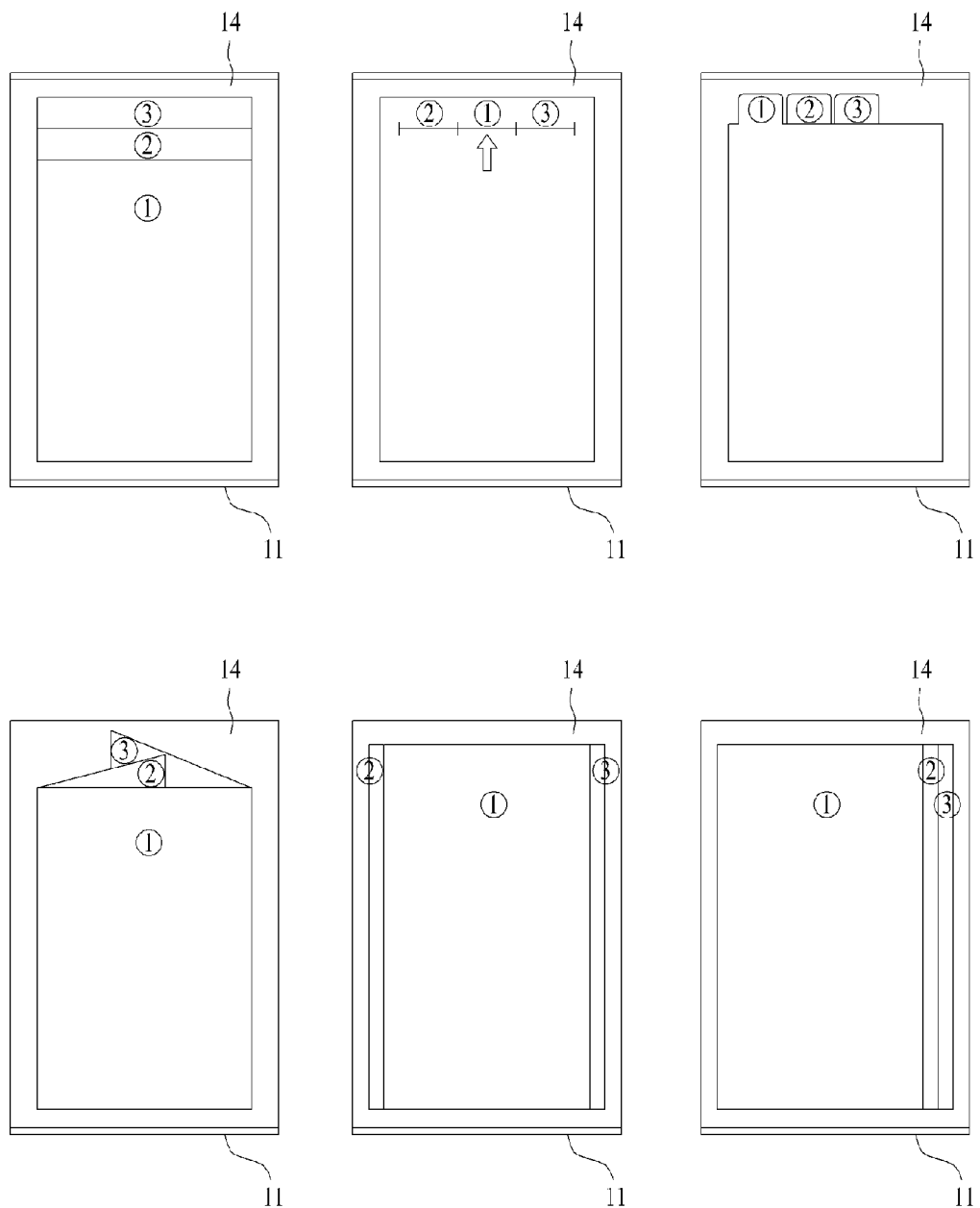
FIG. 7 is a diagram of an indicator indicating an image layer according to one embodiment of the present specification.

FIG. 7 is a diagram of an indicator indicating an image layer according to one embodiment of the present specification. The foldable display device 11 can display an indicator indicating an image layer using a graphic user interface. Referring to FIG. 7, the foldable display device 11 is in a folded mode. The first area 14 is only included in a user's view since the second area and the third area are folded. The foldable display device 11 displays the first image assigned to the first image layer and can display the indicators of the second image and the third image assigned to the second image layer and the third image layer, respectively.

In the top left of FIG. 7, the foldable display device 11 displays the first image and can display the indicators of the second image and the third image at the top of the first image. The foldable display device 11 can display a state that the second image and the third image are overlapped by the first image using the indicator. The foldable display device 11 displays a part of the second image and the third image in the indicator or can display an index for the second image layer and the third image layer in the indicator. If a control input is detected in the area in which the indicator is displayed, the foldable display device 11 can display in a manner of replacing the first image with the second image or the third image.

The foldable display device 11 can determine the priority of the second image and the third image in the indicator according to the order of which each area of the display unit is folded. The top left of FIG. 7 indicates a result that the third area is folded after the second area is folded. Hence, the foldable display device 11 can display a state that the third image is overlapped by the second image in the indicator.

In the top middle of FIG. 7, the foldable display device 11 displays the first image and can display the indicator of the second and the third image at the top of the first image. The foldable display device 11 can display an indicator of a bar type, which indicates a plurality of image layers. The foldable display device 11 can display a position relation of the images assigned to each of the image layers in the indicator. As depicted in FIG. 1, the foldable display device in the unfolded mode 11 displays the first image in the middle of the display unit, displays the second image in the second area positioned at the left of the first area, and displays the third image in the third area positioned at the right of the first area. Hence, the foldable display device 11 can display an index of the first image in the middle of the indicator, display the index of the second image in the left of the indicator, and display the index of the third image in the right of the indicator in a manner of dividing the bar type indicator into three equal parts. And, the foldable display device 11 can additionally display a marker in the bar type indicator to mark which image is currently displayed. If a control input is detected in the area in which the index of the second image or the index of the third image is displayed, the foldable display device 11 can display in a manner of replacing the first image with the second image or the third image. And, the marker can be displayed in a manner of being moved in response to the replaced image.

In the top right of FIG. 7, the foldable display device 11 displays the first image and can display the indicators of the second image and the third image at the top of the first image. The foldable display device 11 adds a tab of the second image and a tab of the third image at the top of the first image and can display the tab as an indicator. The foldable display device 11 displays a part of the second image and the third image in the displayed tab or can display an index for the second image and the third image in the displayed tab. If a control input is detected in the displayed tab area, the foldable display device can display in a manner of replacing the first image with the second image or the third image according to the detected tab area.

The foldable display device 11 can determine the priority of the second image and the third image in the indicator according to the order of which each area of the display unit is folded. The top right of FIG. 7 indicates a result that the third area is folded after the second area is folded. Hence, the foldable display device 11 can display the tab of the third image after displaying the tab of the second image first.

In the bottom left of FIG. 7, the foldable display device 11 displays the first image and can display the indicators of the second image and the third image at the top of the first image. As depicted in FIG. 5, the foldable display device 11 can display a form that the second image and the third image are folded at the top of the first image using the indicator. The foldable display device 11 displays a part of the second image and the third image in the displayed indicator or can display an index for the second image layer and the third image layer in the displayed indicator. If a control input is detected in the area in which the indicator is displayed, the foldable display device 11 can display in a manner of replacing the first image with the second image or the third image.

The foldable display device 11 can determine the priority of the second image and the third image in the indicator according to the order of which each area of the display unit is folded. The bottom left of FIG. 7 indicates a result that the third area is folded after the second area is folded first. Hence, the foldable display device 11 can display a form that the third image is folded after the second image is folded in the indicator.

In the bottom middle of FIG. 7, the foldable display device 11 displays the first image and can display the indicator of the second and the third image at the top of the first image. The foldable display device 11 displays the first image, displays the indicator of the second image, which is used to be displayed in the second area, in the left of the first image, and can display the indicator of the third image, which is used to be displayed in the third area, in the right of the first image. The foldable display device 11 displays a part of the second image and the third image in the displayed indicator or can display an index for the second image layer and the third image layer in the displayed indicator. If a control input is detected in the area in which the indicator is displayed, the foldable display device 11 can display in a manner of replacing the first image with the second image or the third image.

In the bottom right of FIG. 7, the foldable display device 11 displays the first image and can display the indicator of the second and the third image at the left or right of the first image. The foldable display device 11 can display the indicator as a form of a corner of a book. The foldable display device 11 displays the first image assigned to the first image layer as a turned page and can display the indicators of the second image and the third image assigned to the second image layer and the third image layer as next pages. The foldable display device 11 displays a part of the second image and the third image in the displayed indicator or can display an index for the second image layer and the third image layer in the displayed indicator. If a control input is detected in the area in which the indicator is displayed, the foldable display device 11 can display in a manner of replacing the first image with the second image or the third image.

The foldable display device 11 can determine the priority of the second image and the third image in the indicator according to the order of which each area of the display unit is folded. The bottom right of FIG. 7 indicates a result that the third area is folded after the second area is folded first. Hence, the foldable display device 11 can display the indicator in a manner that the indicator of the second image comes after a next page of the first image and the indicator of the third image comes after a next page of the second image.

Figure 8:
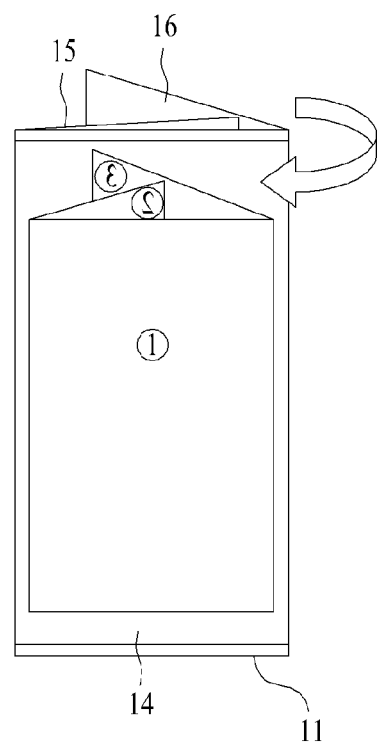
FIG. 8 is a diagram of a method of changing a display area and an image layer when a foldable display device rotates according to one embodiment of the present specification.
Figure 8:
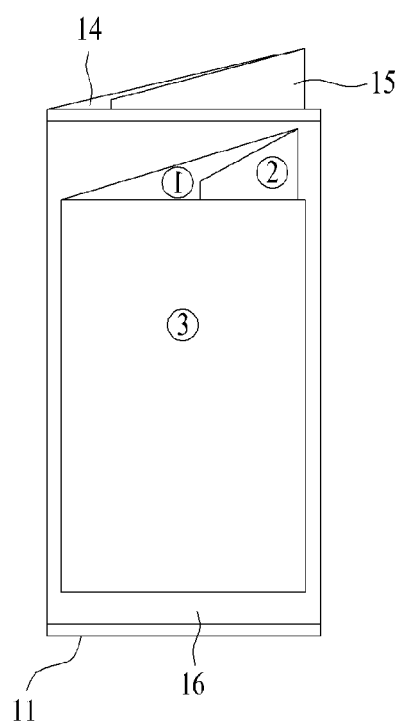

FIG. 8 is a diagram of a method of changing a display area and an image layer when a foldable display device rotates according to one embodiment of the present specification. If the foldable display device 11 rotates in a folded mode, a display area coming into a view of a user changes. Hence, the foldable display device can change the area displaying an image and the image assigned to an image layer of the corresponding area.

In the top of FIG. 8, the first area 14 of the display unit is positioned at the front side of the foldable display device 11 and the second 15 and the third area 16 are facing the back side of the foldable display device. Hence, the foldable display device 11 displays the first image assigned to the first image layer of the first area 14 and can display the indicators of the second image and the third image assigned to the second image layer and the third image layer of the first area.

In this case, the indicators of the second image and the third image can embody the folded second area and the folded third area of the display unit. Since the second area and the third area of the display unit are folded into the direction of the back side of the first area, the foldable display device can display the indicators of the second image and the third image in a state that the indicators are folded into the direction of the back side of the first image.

And, the foldable display device 11 can display the indicators of the second image and the third image facing the direction of the back side of the first image. Consequently, the foldable display device can display the backside of the second image and the backside of the third image using the indicators. In particular, the foldable display device 11 can display the index or image displayed in the indicators in a manner of reversing the left and the right of the index or the image.

The bottom of FIG. 8 is a diagram of a result of rotation of the foldable display device 11 depicted in the top of FIG. 8. In the bottom of FIG. 8, the third area 16 of the display unit is positioned at the front side and the first area 15 is facing the back side of the foldable display device 11. And, the second area 15 can be positioned between the third area 16 and the first area 14 and may face the front side of the foldable display device 11 while being blocked by the third area 16.

If the third area 16 of the display area faces the front side of the foldable device and the first area 14 face the back side of the foldable device by the rotation, the foldable display device 11 can assign the images assigned to the image layers of the first area 14 to the image layers of the third area 16. If the foldable display device 11 is upside down by the rotation, the foldable display device 11 can rearrange the images assigned to the image layers of the first area in the image layers of the third area in reverse order.

In particular, the foldable display device 11 assigns the third image to the first image layer of the third area 16, assigns the second image to the second image layer, and assigns the first image to the third image layer. The foldable display device 11 displays the third image assigned to the first image layer of the third area and can display the indicators of the second image and the first image assigned to the second image layer and the third image layer of the third area. In this case, the indicators of the first image and the second image can embody the folded first area and the folded second area of the display unit. Since the first area of the display unit are folded into the direction of the back side of the third area, the foldable display device 11 can display the indicator of the first image in a state that the indicator is folded into the direction of the back side of the third image. Since the second area of the display unit are folded into the direction of the front side of the third area, the foldable display device 11 can display the indicator of the second image in a state that the indicator is folded into the direction of the front side of the third image.

And, the foldable display device 11 can display the indicator of the first image facing the back side of the third image and the indicator of the second image facing the front side of the third image. Consequently, the foldable display device 11 can display the backside of the first image and the front side of the second image using the indicators. In particular, the foldable display device 11 can display the index of the first image or the first image displayed in the indicator in a manner of reversing the left and the right of the index or the image.

Figure 9:
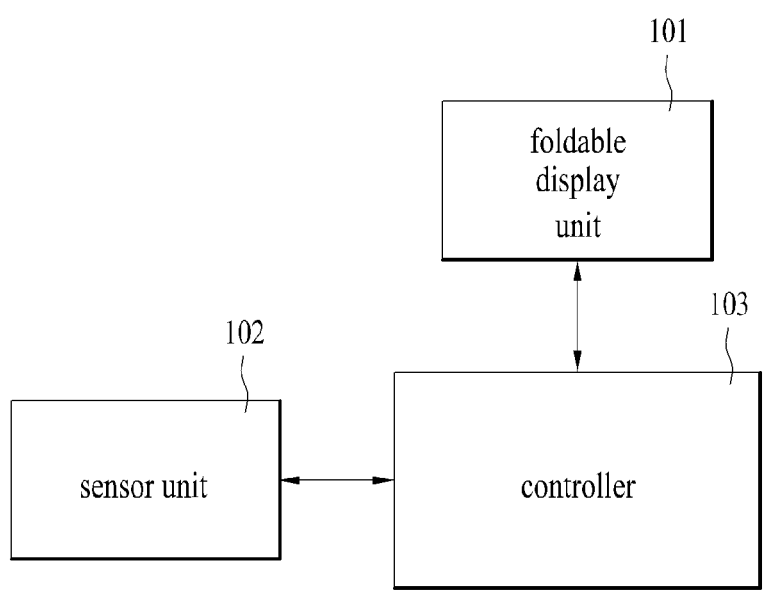
FIG. 9 is a block diagram of a foldable display device according to one embodiment of the present specification.

FIG. 9 is a block diagram of a foldable display device according to one embodiment of the present specification.

The foldable display device can include a foldable display unit 101, a sensor unit 102, and a controller 103.

The foldable display unit can display an image assigned to the first image layer. And, the foldable display unit 101 can display an indicator of the image assigned to the second top image layer. The foldable display unit 101 can be folded or vent in half on the basis of a folding axis. The foldable display unit 101 can be asymmetrically folded on the basis of the folding axis. And, the foldable display unit may have two or more folding axes. For instance, the foldable display unit including two folding axes can be divided into 3 areas and can be folded into a size of ⅓ of the stretched form. The foldable display unit 101 may include at least one selected from the group consisting of an Organic Light-Emitting Diode (OLED), a Liquid Crystal Display (LCD), an E-ink, and a flexible display according to embodiment. In an unfolded mode, the foldable display unit 101 can display images in each of the areas, which are facing the front side and divided by the folding axes, respectively. If at least one area is folded in the unfolded mode, the foldable display unit 101 can be converted into a folded mode. In the folded mode, the foldable display unit 101 can assign the image of the at least one folded area to the second top image layer of the area facing the front side. The foldable display unit 101 can display an indicator of the image assigned to the second top image layer of the area facing the front side in the area facing the front side.

The sensor unit 102 can sense a state of the foldable display device. The sensor unit 102 can sense whether the foldable display device is in the unfolded mode or the folded mode in a manner of measuring an angle formed by an internal angle of the foldable display unit. As a different embodiment, the sensor unit 102 can determine the state of the foldable display device based on a distance between folded display units of the foldable display device or an operating status of a hinge. The sensor unit 102 can deliver information on the state of the sensed device to the controller 103.

The sensor unit 102 can sense a touch input inputted to the foldable display device. The sense unit 102 can sense the touch input of a user using a resistive or a capacitive touch sensor. The touch sensor for each area can be activated or deactivated by the controller according to the each area. The sensor unit can deliver information on the sensed touch input to the controller. The aforementioned foldable display unit 101 and the touch sensor of the sensor unit 102 can be designed to be integrated into a touch sensitive display unit according to embodiment.

The controller 103 can control the sensor unit 102 and the display unit 103 using the information delivered from the sensor unit 102. The controller 103 can detect the state of the foldable display device using the sensor unit 102. The controller can detect whether the foldable display device is in the folded mode or the unfolded mode. Whether the foldable display device is in the folded mode or the unfolded mode can be determined based on the information delivered from the sensor unit telling the state of the device. The controller can assign an image to an image layer according to the detected state of the foldable display device.

The controller 103 can display images in each area of the display unit 101 in an unfolded mode, respectively. If the foldable display device is converted from the unfolded mode to the folded mode, the controller 103 can assign the image displayed in the folded area to the second top image layer of the unfolded area. In particular, the controller 103 assigns an image displayed in the unfolded area to the first image layer, which is the top image layer of the unfolded area, and can assign the image displayed in the folded area to the second image layer which is the second top image layer of the unfolded area.

As described in FIG. 3, the controller 103 displays the image assigned to the top image layer and can display the indicator of the image assigned to the second top image layer. Hence, if a plurality of image layers are included in the area of the display unit 101 and if images are assigned to each of a plurality of the image layers, the controller 103 can provide the information on the image assigned to the second top image layer as well as the image assigned to the top image layer to a user.

And, as explained in FIG. 5, if there exist a plural number of folded areas in the folded mode, the controller 103 can display an indicator in a manner of reflecting an order of which the areas are folded to the indicator. The controller 103 can visually reflects the order in the indicator in a manner of overlapping the image displayed in the firstly folded area to the image displayed in the lately folded area.

And, as explained in FIG. 8, the controller 103 can change the display area by detecting a rotation of the foldable display device. The controller 103 can display an image in an area of the display unit facing the front side. If the area of the display unit facing the front side is changed, an image can be displayed in the changed front side area. An order of images assigned to the image layers of the changed front side area is described in FIG. 8.

FIG. 9 is a block diagram according to one embodiment of the present specification. Blocks represented as being separated are depicted for elements of the foldable display device in a manner of being logically distinguished. Thus, the aforementioned elements of the foldable display device may be equipped with a single chip or a plurality of chips according to a design of the foldable display device.

Figure 10:
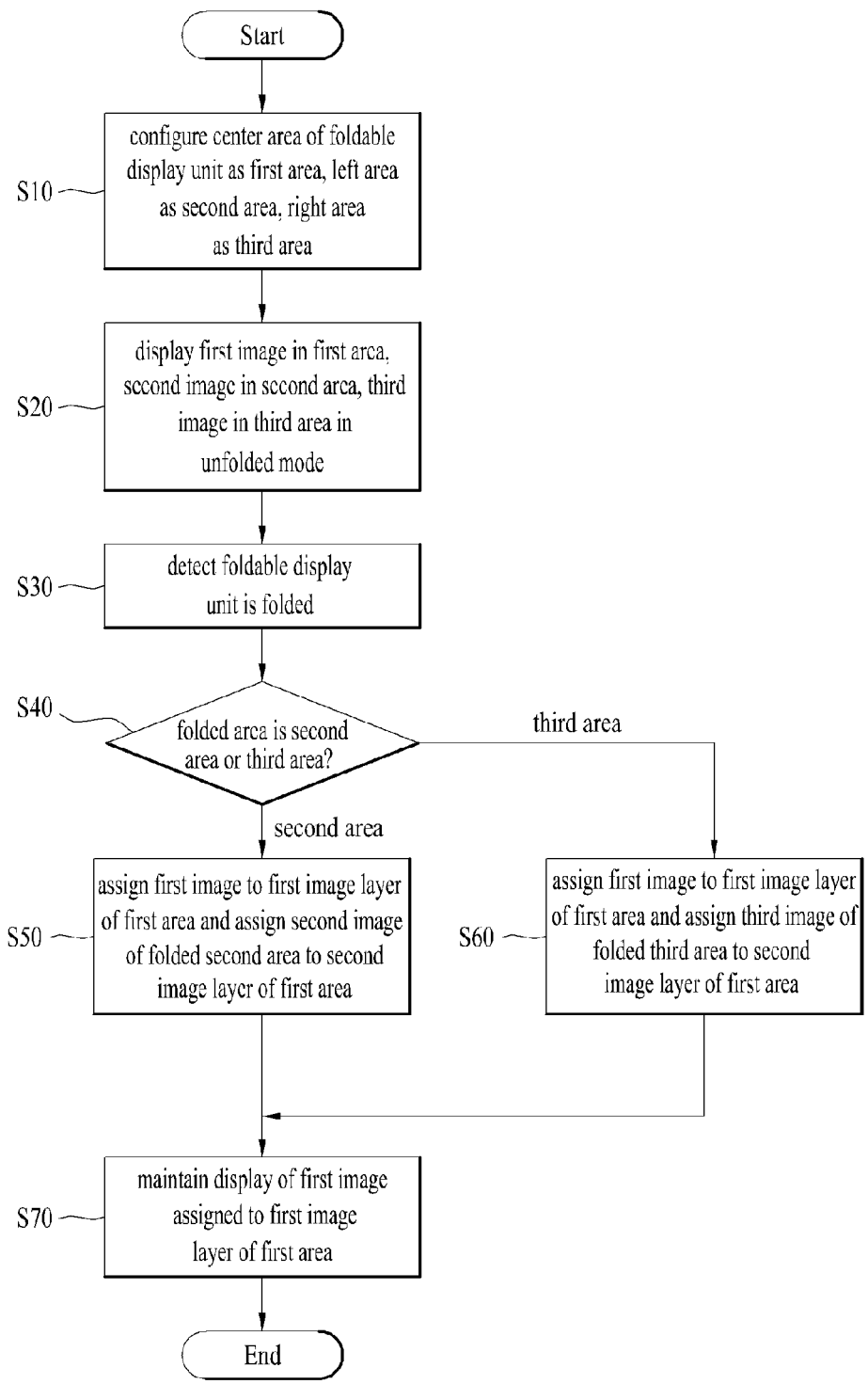
FIG. 10 is a flowchart of a method of controlling a foldable display device according to one embodiment of the present specification.

FIG. 10 is a flowchart of a method of controlling a foldable display device according to one embodiment of the present specification. The foldable display device can configure a center area as a first area, configure a left area as a second area, and configure a right area as a third area [S10]. As described in FIG. 1, the foldable display device can divide the foldable display unit into three areas on the basis of two folding axes. The foldable display device can configure the center area as the first area, configure the area positioned at the left of the first area as the second area, and configure the area positioned at the right of the first area as the third area. Each area can display an image or sense a control input of a user.

In an unfolded mode, the foldable display device can display a first image in the first area, display a second image in the second area, and display a third image in the third area, respectively [S20]. As described in FIG. 1, if the first image is assigned to the first area, the foldable display device can display the first image. And, if the second image and the third image are assigned to the second area and the third area, respectively, the foldable display device can display the second image and the third image. According to embodiment, the foldable display device may perform an operation of assigning the first image to the first image layer of the first area, which is to be performed in the following [S50] and [S60], in the step [S20]. The foldable display device assigns the second image to the first image layer of the second area and can assign the third image to the first image layer of the third area. In this case, the foldable display device can display the image assigned to the first image layer of each area.

The foldable display device can detect that the foldable display unit is folded [S30]. As described in FIG. 9, the foldable display device can detect that at least one of the second area and the third area is folded using the sensor unit. The foldable display device can detect that the display unit is folded using at least one selected from the group consisting of a distance sensor, a hinge sensor, an infrared sensor, an image sensor, and a proximity sensor. If an angle formed by the second area or the third area and the first area is less than an angle threshold or if a distance between the second area or the third area and the first area is less than a distance threshold, the foldable display device can detect as the display unit is folded. The sensor unit can deliver the information on which area is folded in a manner of transmitting the detected result to the controller.

The foldable display device can determine whether the folded area is the second area or the third area [S40]. The foldable display device can determine which area is folded using the information received from the sensor unit. If a folded area is determined, the foldable display device can assign the image displayed in the corresponding area to a different area.

If the second area is folded, the foldable display device assigns the first image to the first image layer of the first area and can assign the second image of the folded second area to the second image layer of the first area [S50]. As described in FIG. 4 to FIG. 5, the foldable display device can assign the first image displayed in the first area to the first image layer of the first area. And, the foldable display device can assign the second image displayed in the folded second area to the second image layer of the first area. The foldable display device can convert the folded second area of the display unit into a power saving mode. For instance, the foldable display device can temporarily maintain a backlight of the second area as an off state. And, if the second area is converted from the folded mode to the unfolded mode, the foldable display device can convert the second area to an active mode.

If the third area is folded after the second area is folded, the foldable display device can assign the third image displayed in the third area to the third image layer of the first area. In particular, the foldable display device can assign the third image to the third image layer, which is a lower layer of the second image layer.

If the third area is folded, the foldable display device assigns the first image to the first image layer of the first area and can assign the third image of the folded third area to the second image layer of the first area [S60]. As described in FIG. 4 to FIG. 5, the foldable display device can assign the first image displayed in the first area to the first image layer of the first area. And, the foldable display device can assign the third image displayed in the folded third area to the second image layer of the first area. The foldable display device can convert the folded third area of the display unit into a power saving mode. For instance, the foldable display device can temporarily maintain a backlight of the third area as an off state. And, if the third area is converted from the folded mode to the unfolded mode, the foldable display device can convert the third area to an active mode.

If the second area is folded after the third area is folded, the foldable display device can assign the second image displayed in the second area to the third image layer of the first area. In particular, the foldable display device can assign the third image to the third image layer, which is a lower layer of the second image layer.

The foldable display device can maintain a display of the first image assigned to the first image layer of the first area [S70]. As described in FIG. 4 to FIG. 5, the foldable display device can maintain a display for the first image assigned to the first image layer of the first area. The foldable display device can preferentially display the first image compared to the second image and the third image assigned to the second image layer and the third image layer and can maintain the first image. In particular, the foldable display device can maintain the first image displayed in the first area in the unfolded mode even after the foldable display device is converted to the folded mode.

As described in FIG. 7, the foldable display device can display the indicator for the second image and the third image, which are assigned to the second image layer and the third image layer of the first area, respectively. The foldable display device can display a form that the second area or the third area is folded using the indicator. The foldable display device can determine the order or the priority of the second image and the third image in the indicator according to the order of which the second area and the third area are folded. The foldable display device can display in a manner of overlapping the image of the firstly folded area to the image of the lately folded area. And, according embodiment, the foldable display device can display position relation of the first, the second, and the third area in a manner of reflecting the position relation to the indicator. In particular, the foldable display device can display the indicator of the second image assigned to the second area, which is positioned at the left of the first area, in the left of the first image and can display the indicator of the third image assigned to the third area, which is positioned at the right of the first area, in the right of the first image. The foldable display device can inform a user of which image is assigned to a lower image layer of the first image layer to which the first image is assigned using the displayed indicator. By displaying the indicator for the image displayed in the folded area in the first area, the foldable display device can continuously provide the information on the area deviated from a view of a user to the user.

As mentioned in the foregoing description, the foldable display device of the present specification can provide the information on a plurality of images to the user with a limited display area in a manner of adaptively changing the image assigned to the image layer of each area according to the state of the foldable display device.

It will be apparent to those skilled in the art that various modifications and variations can be made in the present specification without departing from the spirit or scope of the inventions. Thus, it is intended that the present specification covers the modifications and variations of this invention provided they come within the scope of the appended claims and their equivalents.

What is claimed is:
1. A foldable display device, comprising:
a display unit configured to contain a first area, a second area and a third area;
a sensor unit configured to detect that at least one area of the display unit is folded; and
a controller configured to:
recognize that the second area and the third area are folded,
convert the second area and the third area to an inactive mode,
assign a first image which is displayed at the first area to a first image layer of the first area, the first area being an unfolded area of the display unit,
if the second area is folded and the third area is folded after the second area is folded, assign a second image of the folded second area to a second image layer of the first area, and assign a third image of the folded third area to a third image layer of the first area, and if the third area is folded and the second area is folded after the third area is folded, assign the third image of the folded third area to the second image layer of the first area, and assign the second image of the folded second area to the third image layer of the first area, wherein the first image layer is an upper layer of the second image layer and the third image layer, and the second image layer is an upper layer of the third image layer.

2. The foldable display device of claim 1, wherein the controller is configured to determine each image layer to which the second image and the third image are assigned respectively, according to an order of which the second area and the third area of the display unit are folded.

3. The foldable display device of claim 1, wherein the controller is configured to display the first image assigned to the first image layer of the first area in the first area of the display unit and wherein the controller is configured to display an indicator indicating the second image and the third image in the first area of the display unit.

4. The foldable display device of claim 3, wherein the indicator is a part of the second image and the third image.

5. The foldable display device of claim 3, wherein the indicator comprises a tab linked to the second image and the third image, respectively.

6. The foldable display device of claim 3, wherein the controller is configured to display a virtual object visualizing the folded second area and the folded third area of the display unit with the indicator.

7. The foldable display device of claim 3, wherein the sensor unit is configured to further detect a control input for the display unit and wherein if a magnification of the first image is expanded more than a first threshold by the control input, the controller is configured to display the second image or the third image assigned to the second image layer of the first area in the display unit.

8. The foldable display device of claim 7, wherein the controller is configured to display an indicator of the first image instead of the first image.

9. The foldable display device of claim 3, wherein the sensor unit is further configured to detect a control input for the display unit and wherein if the first image is assigned to the first image layer of the first area, the second image is assigned to the second image layer of the first area, and the third image is assigned to the third image layer of the first area, when the control input for the indicator of the displayed second image is detected, the controller is configured to assign the first image to the second image layer of the first area, configured to assign the second image to the first image layer of the first area, and configured to display the second image.

10. The foldable display device of claim 1, wherein if the first image is assigned to the first image layer of the first area, the second image is assigned to the second image layer of the first area, and the third image is assigned to the third image layer of the first area, when an assignment of the first image to the first image layer of the first area is terminated, the controller is configured to assign the second image to the first image layer of the first area and configured to assign the third image to the second image layer of the first area.

11. The foldable display device of claim 10, wherein the controller is configured to further assign the first image to the third image layer of the first area.

12. The foldable display device of claim 10, wherein the controller is configured to display the second image assigned to the first image layer of the first area in the display unit.

13. The foldable display device of claim 10, wherein if an assignment of the second image to the first image layer of the first area is terminated, the controller is configured to assign the third image to the first image layer of the first area.

14. The foldable display device of claim 1, wherein if the first image is assigned to the first image layer of the first area, the second image is assigned to the second image layer of the first area, and the third image is assigned to the third image layer of the first area, when the folded third area is unfolded, the controller is configured to display the third image in the unfolded third area.

15. The foldable display device of claim 14, wherein the controller is configured to terminate an assignment of the third image to a third image layer of the first area.

16. The foldable display device of claim 1, wherein if the first image is assigned to the first image layer of the first area, the second image is assigned to the second image layer, and the third image is assigned to the third image layer, the controller is configured to assign the third image to a first image layer of the third area, configured to assign the second image to a second image layer of the third area and configured to assign the first image to a third image layer of the third area.

17. The foldable display device of claim 16, wherein when the foldable display device rotates to place the third area at the front of the foldable display device, the controller is configured to perform an operation of assigning the first image, the second, image and the third image to the third area.

18. The foldable display device of claim 1, wherein the controller is configured to display the first image assigned to the first image layer of the first area in the first area and wherein the controller is configured to further display the second image assigned to the second image layer of the first area or the third image in the first area in a manner of controlling transparency of the first image displayed in the first area.

19. A method of controlling a foldable display device including a display unit, the method comprising:
    detecting that a second area and a third area of the display unit are folded;
    converting the second area and the third area to an inactive mode;
    assigning an image which is displayed at a first area to a first image layer of the first area, the first area being an unfolded area of the display unit;
    if the second area is folded and the third area is folded after the second area is folded, assigning a second image of the folded second area to a second image layer of the first area, assigning a third image of the folded third area to a third image layer of the first area; and
    if the third area is folded and the second area is folded after the third area is folded, assigning the third image of the folded third area to the second image layer of the first area, assigning the second image of the folded second area to the third image layer of the first area,
    wherein the first image layer is an upper layer of the second image layer and the third image layer, and the second image layer is an upper layer of the third image layer.

* * * * *